Patented Sept. 19, 1944

2,358,365

UNITED STATES PATENT OFFICE 2,358,365

SULPHONAMIDE DERIVATIVES AND PROCESS FOR OBTAINING THE SAME

Benjamin F. Tullar, St. Clair Shores, Mich., assignor to Parke, Davis & Company, Detroit, Mich., a corporation of Michigan No Drawing. Application August 3, 1940, Serial No. 351,151

8 Claims. (Cl. 260—397.6)

This invention relates to diamino diphenyl sulphones having a sulphonamide or substituted sulphonamide substituent attached to a carbon atom of one of the phenyl nuclei. The invention relates more particularly to compounds of the general formula,

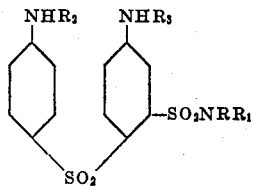

where $R_1$, $R_2$ and $R_3$ represent members of the group consisting of hydrogen and organic carboxylic acid radicals and R is a member of the class hydrogen and an alkali metal such as sodium. The compounds of the invention are useful as therapeutic agents, for example, as internal antiseptics, and also serve as intermediates for the preparation of compounds having such properties.

The compounds of the invention may be obtained by more than one method. For example, the corresponding sulphonamide substituted diphenylsulphone having a nitro group substituted in one of the phenyl nuclei can first be prepared and the nitro group reduced to an amino group. Alternatively, the corresponding dinitro diphenylsulphide having a sulphonic acid group attached to the 2 position of one of the phenyl nuclei can be reduced to the diaminosulphide and the sulphide oxidized to sulphone with or without protection of the amino groups by organic carboxylic acid. The resulting 2-sulphonic acid sulphone derivative can then be converted to the corresponding 2-sulphonamide compound. These transformations and also others giving new compounds of the invention will be more fully illustrated by the following examples and disclosures.

EXAMPLE 1.—PREPARATION OF 4,4'-DIAMINO DIPHENYL SULPHONE-2-SULPHONAMIDE BY REDUCTION OF THE NITRO DERIVATIVE

The intermediate, p-acetaminobenzene sulphinic acid and 2-chloro-5-nitrobenzene sulphonamide compounds are first prepared for reaction to give 4-acetamino-4'-nitro diphenylsulphone-2-sulphonamide. The nitro group of the latter compound is then reduced to an amino group and the resulting product hydrolyzed to split off the acetyl, thereby yielding the desired diamino compound.

(a) *Preparation of p-acetaminobenzene sulphinic acid*

1500 grams of anhydrous sodium sulphite are dissolved in 7200 cc. of water and 1000 grams of p-acetaminobenzene sulphonyl chloride put into the well stirred solution and 10 N sodium hydroxide added at such a rate as to keep the mixture slightly alkaline. During a period of 1 hour the temperature rises to 50° C. and practically complete solution results. The stirring is continued for 2 hours, insoluble matter filtered off and the filtrate cooled to 10° C. and acidified to Congo red rapidly with a cooled solution of 500 grams of concentrated sulphuric acid in 500 grams of ice. The mixture is allowed to stand to complete the precipitation of the sulphinic acid and is then filtered, washed with a little ice water to remove sulphonic acid and sodium sulphate and the washed precipitate dried in vacuo to avoid oxidation. The dry p-acetaminobenzene sulphinic acid melts at 145–155° C. This intermediate has the formula,

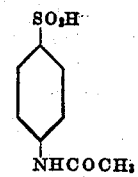

(b) *Preparation of 2-chloro-5-nitrobenzene sulphonamide*

2-chloro-5-nitrobenzene sulphonic acid is first made and then converted into the corresponding sulphonamide. 920 cc. of fuming sulphuric acid (containing 20% $SO_3$) are added to 650 grams of p-chloronitrobenzene and the mixture heated carefully to 120° C. in an oil bath. The heat of reaction increases the temperature fairly rapidly to 140-150° C. The temperature should be kept below about 160° C. and preferably at 140-150° C. for 5 hours to complete sulphonation. At the end of this time the mixture is cooled to room temperature and poured onto 2 gallons of finely chopped ice. The insoluble 2-chloro-5-nitrobenzene sulphonic acid separates out and is filtered off until dry on a suction filter. The yield of precipitated acid can be increased by salting out with sodium chloride before filtering. The solid acid is then dissolved in 3 liters of hot water and 500 grams of potassium hydroxide added carefully to give a slightly alkaline reaction. The mixture is cooled to 0° C. and the potassium salt is filtered off and dried at 85-90° C. overnight. The potassium 2-chloro-5-nitrobenzene sulphonate thus obtained is a cream colored product completely soluble in hot water.

875 grams of the dry potassium salt of 2-chloro-5-nitrobenzene sulphonic acid obtained as described above are mixed with 2250 grams of chlorosulphonic acid and the mixture heated at 140-150° C. for 4 hours in an oil bath. Thereafter the mixture is cooled to 25° C. and cautiously poured into 5 gallons of ice while stirring vigorously. This serves to decompose the excess chlorosulphonic acid and the reaction mixture is then filtered, washed with ice water and sucked dry. The 2 - chloro - 5 - nitrobenzene sulphonyl chloride thus obtained is added rapidly to 3-liters of concentrated ammonium hydroxide which is cooled to a temperature of 0° C. The temperature of the mixture rises to 30-35° C. and the sulphonyl chloride almost completely dissolves, followed by immediate heavy crystallization of its corresponding sulphonamide. After stirring the mixture for a considerable time, most of the ammonia is evaporated in vacuo, the residue cooled, neutralized with HCl and filtered. The filter cake is suspended in hot water, treated with excess HCl, cooled and filtered to separate the insoluble sulphonamide from soluble sulphonic acid. The sulphonamide can be taken up in hot 50% alcohol, charcoaled and recrystallized to give 2-chloro-5-nitrobenzene sulphonamide melting at 182-186° C. This compound has the formula,

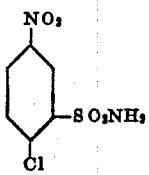

(c) 4 - acetamino-4'-nitro-diphenylsulphone-2'-sulphonamide by condensation of the sodium salt of p-acetaminobenzene sulphinic acid and 2-chloro-5-nitrobenzene sulphonamide 500 grams of the sulphinic acid, prepared as described above under (a), are dissolved in 8 liters of water containing one equivalent of sodium hydroxide (about 100 grams) and made slightly acid to litmus with a few grams of excess p-acetaminobenzene sulphinic acid. 500 grams of 2-chloro-5-nitrobenzene sulphonamide are then added and the mixture refluxed with stirring for 48 hours, after which most of the desired sulphone is filtered off while hot and washed with hot water. The remaining sulphone is obtained by concentrating the filtrate to half its volume and refluxing for 24 hours and filtering. The 4 - acetamino-4'-nitrodiphenylsulphone-2'-sulphonamide has a melting point of about 275° C. and has the formula,

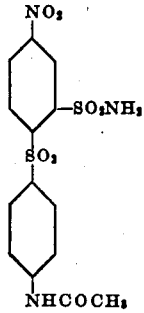

(d) Reduction and then hydrolysis of 4-acetamino-4'-nitro diphenylsulphone-2'-sulphonamide to 4,4'-diamino diphenylsulphone-2-sulphonamide 625 grams of the acetyl amino nitro diphenylsulphone sulphonamide of (c) above are added to 10 liters of water containing 10 cc. of acetic acid at 90° C. and 700 grams of iron dust cautiously added to the well stirred solution as rapidly as the reaction will permit. The mixture is stirred for 1 hour at 90-95° C. 300 cc. of 10 N. sodium hydroxide solution are added to the reaction mixture while stirring thoroughly to dissolve all of the sulfonamide. The iron residue is filtered off and washed with dilute alkali. The filtrate is cooled to room temperature and neutralized to litmus with acetic acid. A product separates at this point which can be filtered off and dried and which is 4'-acetamino-4-amino diphenylsulphone-2-sulphonamide having a melting point of about 265° C. It is redissolved in 3 liters of hot water containing 300 grams of sodium hydroxide and boiled 15 minutes to hydrolyze off the acetyl group. The solution is cooled, treated with decolorizing charcoal and neutralized with acetic acid whereupon the product separates and is filtered off, washed well with water and dried at 85-90° C. It is 4,4'-diamino diphenylsulphone-2-sulphonamide of a light cream to white color and melting at about 236° C. If desired, the product can be purified further by redissolving in dilute alkali, decolorizing with charcoal and reprecipitating with acetic acid. It has the formula, when dried, of

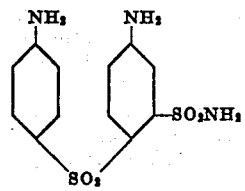

EXAMPLE 2.—PREPARATION OF 4,4'-DIAMINO DIPHENYL SULPHONE-2-SULPHONAMIDE BY OXIDATION OF THE SULPHIDE DERIVATIVE

In this method a 4,4'-dinitro diphenyl sulphide having a sulphonic acid group at the 2 position is reduced to the corresponding diamino derivative, which is then oxidized to the sulphone and the sulphonic acid group converted into a sulphonamide radical.

(a) Preparation of 4,4'-diamino diphenyl sulphide-2-sulphonic acid and its acetyl derivative 85 grams of 4,4'-dinitro diphenyl sulphide-2-sulphonic acid are mixed with 150 grams of iron dust and 50 cc. of water containing 1 cc. of acetic acid and the mixture stirred for 1 hour at 90° C. 50 cc of 10 N NaOH are added with strong stirring for several minutes and the mixture filtered. The filtrate is neutralized with acetic acid and cooled to 0° C. and the 4,4'-diamino diphenyl sulphide-2-sulphonic acid which separates is filtered off and dried. It has the melting point of 295° C.

50 grams of the diamino compound are treated with the required amount of sodium hydroxide to produce the sodium salt which is obtained by evaporating the solution and drying it in vacuo. The sodium salt thus obtained is mixed with 330 cc. of acetic acid and 80 cc. of acetic anhydride and the mixture heated to boiling to give a clear solution of 4,4'-diacetamino diphenyl sulphide-2-sulphonic acid.

(b) *Preparation of the sulphone derivative by oxidation of the sulphide*

The solution of the diacetamino diphenyl sulphide is cooled to 40° C. and 80 cc. of 30% hydrogen peroxide added. The temperature goes up slowly to about 80° C. where it remains for about 10 minutes and then begins to drop. At 70° C., crystallization of the sulphone begins. The mixture is heated 1 hour at 70–80° C., cooled to 20° C. and 1500 cc. of ether added. The precipitate is filtered and washed with several portions of ether and dried at 80° C. This dry product is sodium - 4,4'-diacetamino diphenylsulphone-2-sulphonate.

(c) *Conversion of the sulphone sulphonate to a sulphone sulphonamide*

37 grams of sodium-4,4'-diacetamino diphenylsulphone-2-sulphonate are mixed with 50 grams of phosphorous pentachloride and the mixture heated for 1 hour on a steam bath until the reaction mixture becomes liquefied and the evolution of hydrogen chloride begins to decrease. The mixture is poured into ice water with strong stirring, filtered on a suction filter and washed well with ice water. It is then dissolved in chloroform and separated from any water layer and then dried in contact with anhydrous calcium sulphate from which it is then separated. Ammonia gas is then passed through the dry chloroform solution of the 2-sulphonyl chloride derivative whereupon 4,4'-diacetamino diphenylsulphone-2-sulphonamide precipitates out. It is filtered off and dried and recrystallized from 50% aqueous acetic acid solution and then has the melting point of 275° C. It has the formula, when dried, of

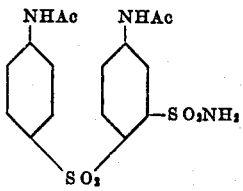

The diacetamino compound melting at 275° C. can be hydrolyzed by treating it with an excess of dilute sodium hydroxide while refluxing for about an hour and then the solution neutralized to litmus with acetic acid whereupon 4,4'-diamino diphenylsulphone-2'-sulphonamide separates out. It is filtered off and can be recrystallized if necessary to give a product melting at about 236° C. and identical with the product of Example 1.

Example 1 above shows the preparation of two compounds of the general class, namely, 4'-acetamino-4-amino diphenylsulphone-2-sulphonamide and the product resulting from hydrolyzing off its acetyl radical, 4,4'-diamino diphenylsulphone-2-sulphonamide. The latter compound containing no organic carboxylic acid radical is the same final product as obtained in Example 2. However, Example 2 also describes preparation of a third compound under the general formula, namely, the intermediate 4,4'-diacetamino diphenylsulphone-2-sulphonamide. In Example 2 this intermediate diacetamino compound is hydrolyzed to give the corresponding 4,4'-diamino diphenyl - sulphone - 2 - sulphonamide identical with the final product of Example 1. The interrelationships of these 3 compounds for the above two examples can be illustrated diagrammatically as follows,

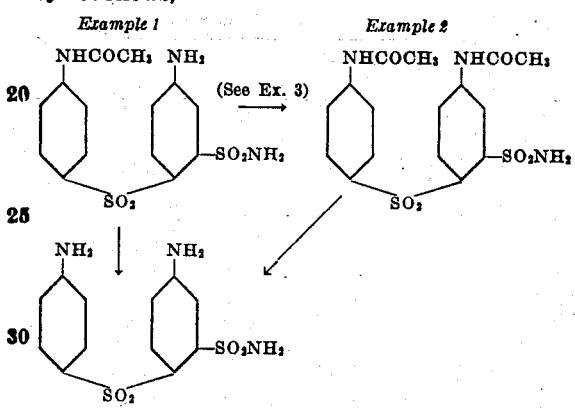

Other compounds falling within the new class of compounds can be made by methods analogous to those used in Examples 1 and 2. The compounds of Examples 1 and 2 can also be made by other methods. For instance, the 4,4'-diacetamino diphenylsulphone-2-sulphonamide of Example 2(c) can be made from the mono-acetyl derivative of Example 1. This will be illustrated by the following example.

EXAMPLE 3.—PREPARATION OF 4,4'-DIACETAMINO DIPHENYLSULPHONE-2-SULPHONAMIDE BY ACETYLATION OF 4-ACETAMINO-4'-AMINO DIPHENYLSULPHONE-2'-SULPHONAMIDE 34 grams of 4-acetamino-4'-amino diphenyl sulphone-2'-sulphonamide, 100 grams of acetic anhydride and 100 grams of acetic acid are shaken together in the cold and then heated to 65° C. and allowed to stand for a short time. The reaction materials are then poured onto ice and filtered. The solid on the filter is then taken up with warm 4 N hydrochloric acid and filtered to remove any of the mono-acetyl compound which is soluble. The product remaining on the filter is the 4,4'-diacetamino diphenylsulphone-2'-sulphonamide which can be recrystallized from acetone to give a product melting at about 275° C.

EXAMPLE 4.—VARIATION OF THE METHOD OF EXAMPLE 1 FOR PREPARATION OF 4,4'-DIAMINO DIPHENYLSULPHONE-2-SULPHONAMIDE

In this case, instead of directly reducing the nitro group of the 4-acetamino-4'-nitro diphenylsulphone-2'-sulphonamide obtained under 1(c), the acetyl radical of the 4-acetamino group is first hydrolyzed. For example, 15 grams of 4-acetamino-4'-nitro diphenylsulphone-2-sulphonamide are hydrolyzed with 50 cc. of acetic acid, 25 cc. of hydrochloric acid and 25 cc. of water by boiling the mixture for 15 minutes. The product is then cooled, diluted, neutralized and filtered. Upon recrystallization from 60% acetone, the 4-amino-4'-nitro diphenylsulphone-2-sulphonamide is obtained, melting at about 236° C.

10.5 grams of the amino nitro sulphone sulphonamide are dissolved in 250 cc. of absolute ethyl alcohol, the solution mixed with 1 gram of Raney nickel catalyst and then treated with hydrogen at about 60 lbs. pressure and between 80 and 90° C. for 2 hours. The reduced nitro compound is practically insoluble in the hot alcohol and is filtered off and extracted from the catalyst with which it is mixed by using dilute sodium hydroxide which readily dissolves the sulphonamide. The alkali solution is made acid with HCl, filtered from any insoluble material and carefully neutralized with alkali, using sodium acetate at the end. The 4,4'-diamino diphenylsulphone-2-sulphonamide identical with that of Example 1 separates out and can be filtered off. If desired, it can be recrystallized from dilute acetic acid.

EXAMPLE. 5.—4,4'-DIACETAMINO DIPHENYLSULPHONE-2-N-ACETYL SULPHONAMIDE 50 grams of the 4,4'-diamino diphenylsulphone-2-sulphonamide described in Example 1 are added slowly and in small quantities to 300 cc. of acetic anhydride which is at a boiling temperature. The acetic anhydride containing the sulphone compound is boiled for 1 hour and then poured into a large volume of water. The 4,4'-diacetamino diphenylsulphone - 2 - N-acetyl sulphonamide separates out and is filtered off and dried. It has a melting point of about 295° C. It may be recrystallized from acetone-water if desired.

EXAMPLE 6.—4,4'-DIAMINO DIPHENYLSULPHONE-2-N-ACETYL SULPHONAMIDE AND ITS SALTS 36 grams of the 4,4'-diacetamino diphenylsulphone-2-N-acetyl sulphonamide of the preceding example are mixed with 10 grams of sodium hydroxide and 200 cc. of water and the mixture heated to boiling for 20 minutes. A heavy precipitate forms. The mixture is cooled and the insoluble material filtered off and purified by dissolving it in a minimum of boiling water, treating with decolorizing charcoal, filtering and cooling the filtrate, whereupon the purified solid compound separates out and is filtered off. It is the sodium salt of 4,4'-diamino diphenylsulphone-2-N-acetyl sulphonamide which decomposes when heated above 325° C. The formula of this salt is,

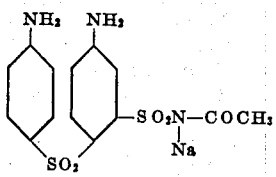

If the sodium salt is dissolved in water and the solution made acid to Congo red with sulphuric or hydrochloric acid, the free amide precipitates and can be filtered off and purified. After recrystallizing it from aqueous alcohol, it has a melting point of about 285° C. It has the formula,

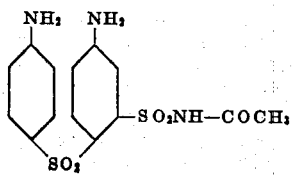

The alkali metal salts corresponding to the sodium salt of Example 6 can readily be prepared for any of the sulphone sulphonamides of this invention. For example, the potassium salts are prepared in a similar manner to that described for the preparation of the sodium salt. These salts have the general formula,

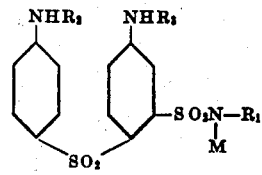

where $R_1$, $R_2$ and $R_3$ have the same significance as in the general formula already given and where M represents an alkali metal such as sodium.

Among the salts of the invention, the preferred compounds are those where $R_1$ of the general salt formula represents an organic carboxylic acid radical, since these compounds are water soluble and stable. They do not hydrolyze in aqueous solution to give the corresponding free N-acyl sulphonamide. Their aqueous solutions have a pH close to neutral and they are exceptionally useful compounds for injection purposes. Examples of compounds of this preferred type are the sodium salts of 4,4'- diacetamino diphenylsulphone - 2 - N - acetyl sulphonamide; 4-acetamino, 4'-amino-diphenylsulphone-2'-N-acetyl-sulphonamide; 4-amino-4'-acetamino diphenylsulphone-2'-N-acetyl sulphonamide and 4,4'-diamino diphenylsulphone-2'-N-acetyl sulphonamide. The corresponding compounds in which the acetyl groups are replaced by other organic carboxylic acid radicals are also prepared in an exactly analogous manner.

Both the salts and the free sulphonamide compounds of the invention can be prepared having various organic carboxylic acid radicals attached to one or both of the two amino nitrogen atoms or to the sulphonamide nitrogen atom.

EXAMPLE 7. — 4,4'-DIACETAMINO DIPHENYLSULPHONE-2-N-NICOTINYL SULPHONAMIDE 10.5 grams of nicotinyl chloride, 12 grams of 4,4'-diacetamino diphenylsulphone - 2 - sulphonamide and 50 cc. of pyridine are refluxed for 1½ hours. The solution is poured into 400 cc. of water and the solid which separates is filtered off. It is dried and when heated, it softens and sinters at about 150° C. and melts at about 190-260° C. It can be purified by recrystallizing from dilute acetic acid whereupon it gives the following behavior in a melting point test. At about 170° C. a liquid phase separates which becomes solid as the temperature increases further and does not melt until a temperature of about 285-290° C. is reached. This product analyzes approximately the theoretical percentage of nitrogen for 4,4'-diacetamino diphenylsulphone-2-N-nicotinyl sulphonamide of the formula,

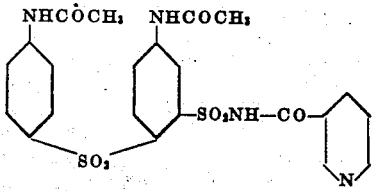

The diacetamino compound of this example can be converted into 4,4'-diamino diphenylsulphone-2-N-nicotinyl sulphonamide by the following example.

EXAMPLE 8

6 grams of 4,4'-diacetamino diphenylsulphone-2-N-nicotinyl sulphonamide, 1.5 grams of sodium hydroxide and 50 cc. of water are heated to boiling for 20 minutes and then filtered and the filtrate cooled and precipitated with a slight excess of acetic acid. The precipitate is filtered off and can be recrystallized from 50% acetic acid. When dried, it is a light-yellow product having the melting point of 247–250° C.

From the above given description of the invention, it is apparent that the following formulas illustrate more systematically the compounds of the invention.

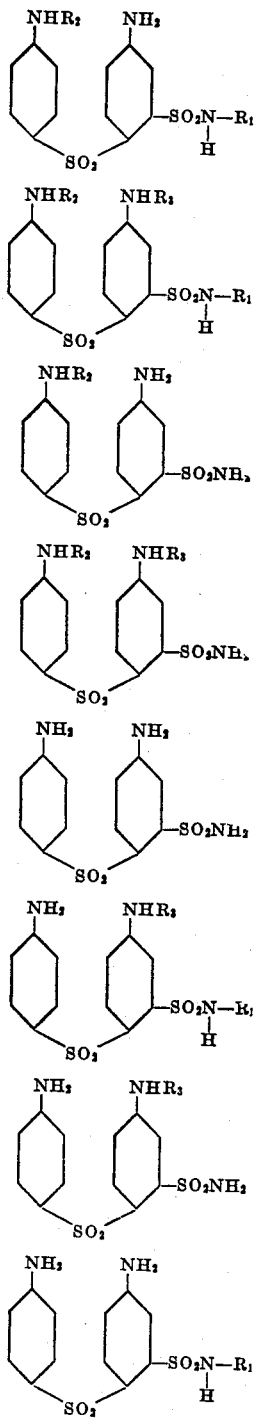

where $R_1$, $R_2$ and $R_3$ represent radicals of organic carboxylic acids capable of replacing by direct or indirect methods a hydrogen atom of the sulphonamide group, $-SO_2NH_2$. In most cases, the organic carboxylic acid radical can be directly introduced, providing it can be made in the form of its acid chloride. In the case of some hydroxy carboxylic acids, it may be necessary to protect the alcoholic hydroxyl groups before forming the acid chloride and, after reacting the acid chloride to replace a hydrogen of the sulphonamide group, splitting off the protecting groups for the alcoholic hydroxyls. For example, the acid chloride of pentaacetyl gluconic acid can be used to replace a hydrogen of the sulphonamide group and the acetyl groups protecting the hydroxyls of the gluconic acid finally hydrolyzed off. In this way, $R_1$, $R_2$ and $R_3$ represent the radicals of numerous organic carboxylic acids such as acetic, propionic, butyric, oleic, linoleic, palmitic, higher aliphatic acids, nicotinic, mandelic, benzoic, salicylic, cinnamic, lactic, malic, maleic, phthalic, citric acid, etc. The invention also includes the alkali metal salts of the compounds mentioned, especially the sodium salts of those compounds in which one of the two sulphonamide hydrogen atoms is replaced by an organic carboxylic acid radical.

As already mentioned, the methods employed are capable of some variation. However, in all of them the starting material is a diphenyl sulphone having a sulphonamide or N-acyl sulphonamide group in one phenyl nucleus and either a nitro or an amino or acylamino group in each of the phenyl nuclei. The starting material is then treated by one of the following three methods:

(a) Reducing the nitro groups to amino groups, before or after protecting any amino groups already present, for example, by converting to a carbo-alkyloxy- (or carbo-aralkyloxy-) derivative.

(b) Acylate any amino groups either selectively or in toto.

(c) Partially or completely de-acylate any acyl amino groups.

By these methods any of the eight types of compounds, the formulas of which are given above, may be obtained.

What I claim as my invention is:

1. A compound of the formula

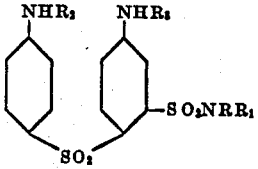

where $R_2$ and $R_3$ represent members of the group consisting of hydrogen and organic carboxylic acid radicals, $R_1$ is a member of the class consisting of hydrogen and organic carboxylic acid radicals and R is a member of the class hydrogen and an alkali metal.

2. 4,4' - diamino diphenylsulphone-2-sulphonamide.

3. A process for preparing 4,4' diamino diphenyl sulphone-2-sulphonamide, which comprises reacting sodium P-acetaminobenzene sulphinate with 2-chloro-5-nitrobenzenesulphonamide, reducing the nitro group in the thus formed product to the amino group and then hydrolizing the acetylamino group.

4. A compound of the formula

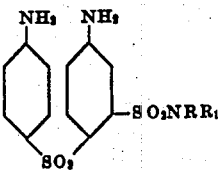

where R₁ is a member of the class consisting of hydrogen and organic carboxylic acid radicals and R is a member of the class consisting of hydrogen and an alkali metal.

5. A compound of the formula

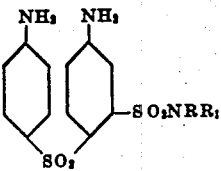

where R₁ is a lower aliphatic acyl radical and R is a member of the class consisting of hydrogen and an alkali metal.

6. A compound having the formula

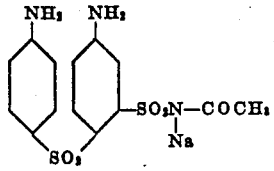

7. A compound having the formula

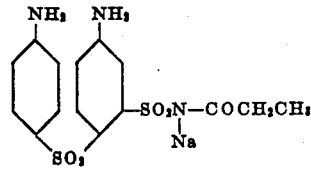

8. A process for preparing 4,4'-diamino diphenyl sulphone-2-sulphonamide which comprises reacting sodium p-acetamino-benzene sulphinate with 2'-chloro-5-nitrobenzenesulphonamide thereby obtaining 4-acetamino-4'-nitrodiphenyl sulphone-2'-sulphonamide, and subjecting said compound to the steps of reduction and hydrolysis in either order, the reduction converting the 4'-nitro group to the 4'-amino group and the hydrolysis converting the 4-acetamino to the 4-amino group.

BENJAMIN F. TULLAR.